May 13, 1952  B. ESSICK  2,596,473
TRACTOR SPRAYER
Filed Feb. 8, 1947  2 SHEETS—SHEET 1
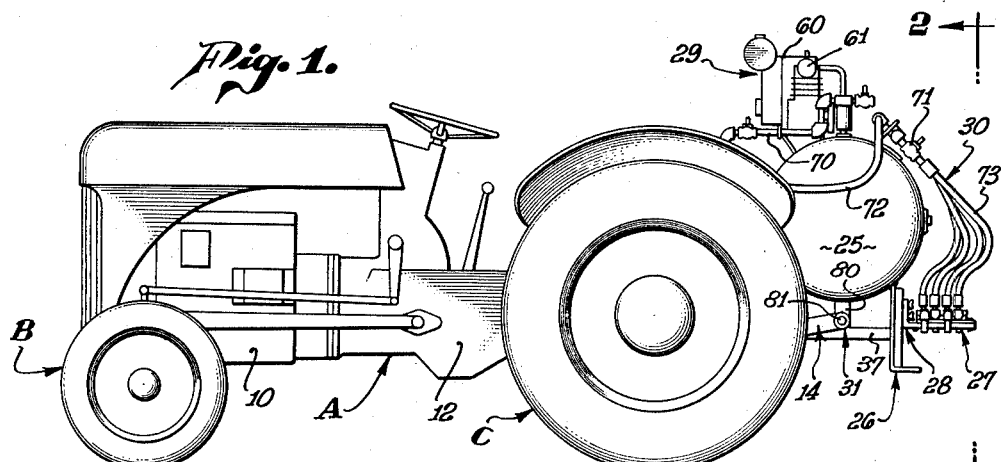
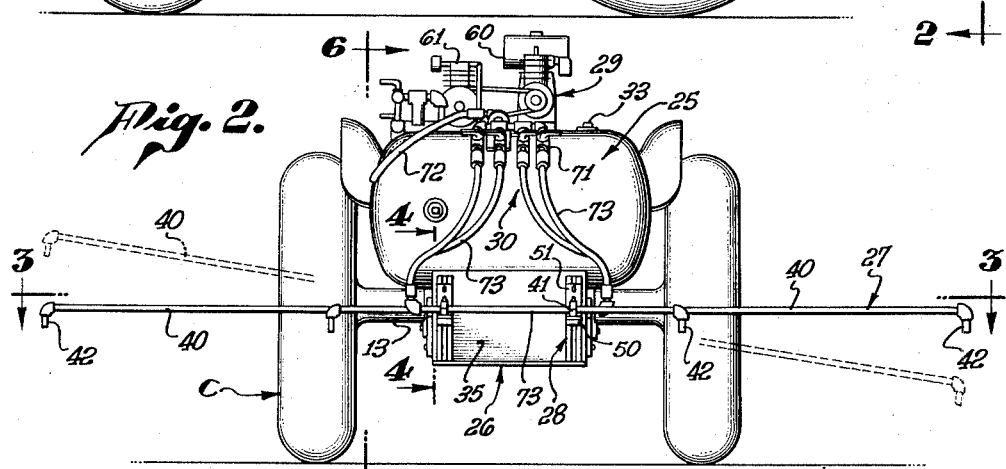
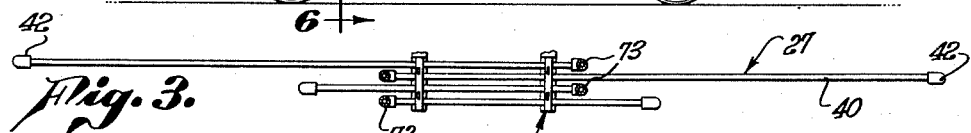
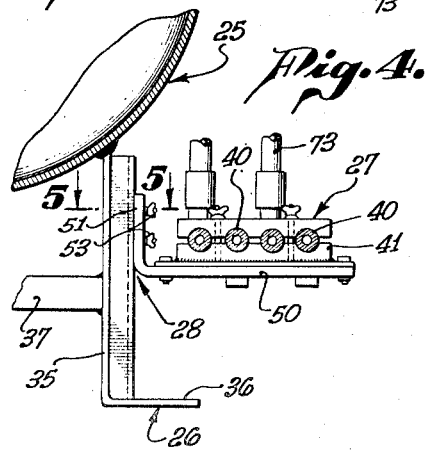
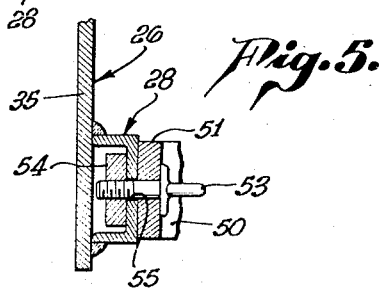
INVENTOR
Bryant Essick
BY
ATTORNEY

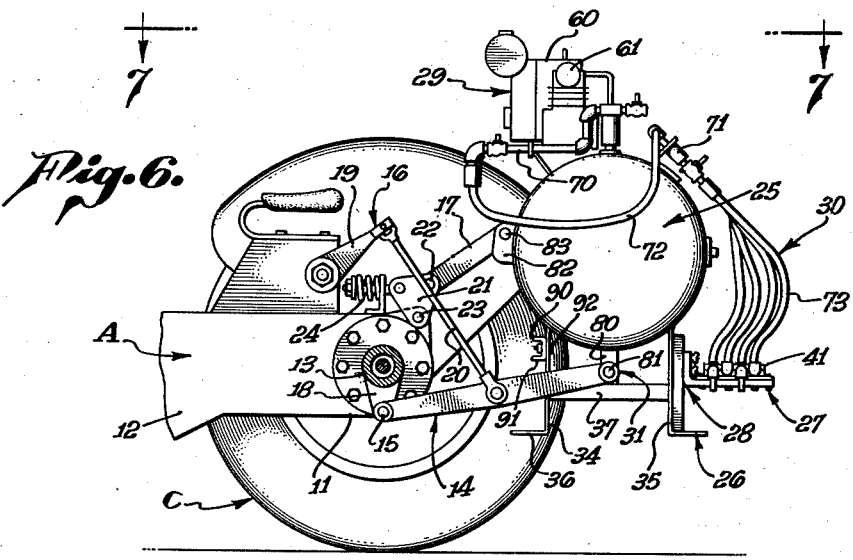
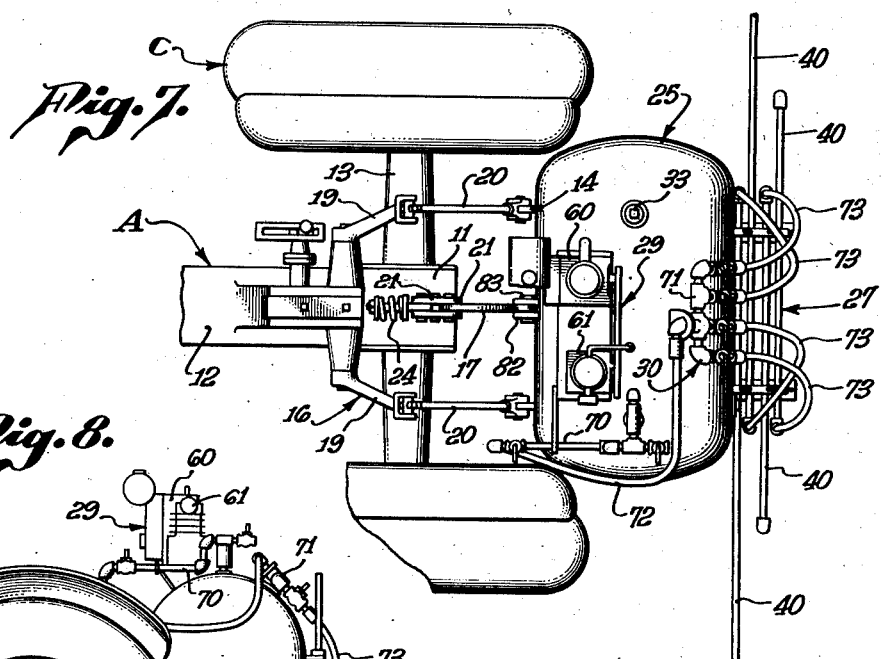
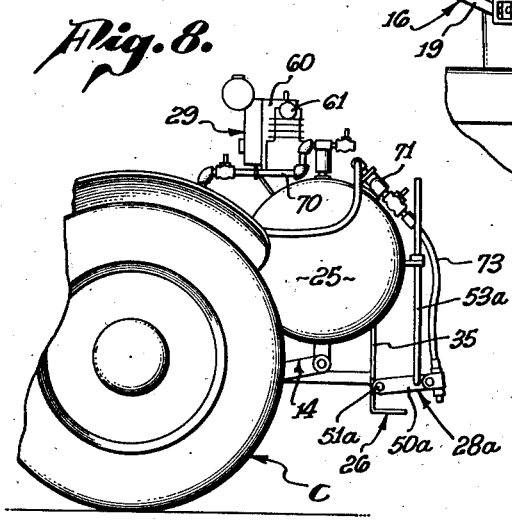

Patented May 13, 1952

2,596,473

UNITED STATES PATENT OFFICE 2,596,473

TRACTOR SPRAYER

Bryant Essick, Los Angeles, Calif., assignor to Essick Manufacturing Company, Los Angeles, Calif., a corporation of California Application February 8, 1947, Serial No. 727,398

11 Claims. (Cl. 299—30)

This invention has to do with a tractor sprayer, that is, with a machine combining in a unit a tractor and spraying apparatus, and it is an object of the invention to provide a machine utilizing a standard or conventional tractor and spraying apparatus involving certain structural features such as adjustments which, combined with those available through the tractor, provide a unit which is simple, effective, and highly practical in operation.

Spraying apparatus or spraying devices are being used extensively in agriculture, and it is now particularly common to use such apparatus in the control of weeds. It is, of course, common to use tractors for various purposes. However, ordinarily when an ordinary tractor is employed to propel spraying equipment the spraying equipment requires a wheeled support and the assembly is usually complicated and cumbersome and is limited as to utility.

It is a general object of my present invention to provide, as a single, compact, unit a tractor and spraying apparatus in which the tractor forms the sole support and carrier for the spraying apparatus. Through the structure that I have provided I combine a conventional tractor and commercially practical spraying outfit in such a manner that the spraying outfit is wholly supported and manipulated from the tractor, making special supporting means for the spraying apparatus wholly unnecessary.

It is a further object of my present invention to provide a unit involving a spraying apparatus including features of adjustment and a tractor supporting the spraying apparatus, the support from the tractor being through adjustable means which, combined with the adjustability of the spraying apparatus itself makes possible overall adjustments which are highly advantageous in the practical handling and operation of the spraying apparatus.

It is a further object of the present invention to provide a machine of the general character referred to in which the spraying apparatus, as such, is simple and compact, being free of cumbersome or complicated elements accommodating it to the tractor and in which the tractor, as such, is in no way impaired or complicated, with the result that it is available for use in the ordinary manner upon the spraying apparatus being detached therefrom.

The various objects and features of my invention will be fully understood from the following detailed description of typical preferred forms and applications of the invention, throughout which description reference is made to the accompanying drawings, in which:

Fig. 1 is a side elevation of a typical machine embodying the present invention, showing the spraying apparatus supported by the tractor in position to be transported thereby. Fig. 2 is a rear view of the tractor shown in Fig. 1, being a view taken as indicated by line 2—2 on Fig. 1. Fig. 3 is a plan view of a portion of the apparatus taken substantially as indicated by line 3—3 on Fig. 2. Fig. 4 is an enlarged sectional view taken as indicated by line 4—4 on Fig. 2. Fig. 5 is an enlarged detailed sectional view taken as indicated by line 5—5 on Fig. 4. Fig. 6 is an enlarged detailed sectional view taken as indicated by line 6—6 on Fig. 2 at the rear end portion of the tractor, showing the manner in which the spraying apparatus is coupled and related to the tractor. Fig. 7 is a plain view taken as indicated by line 7—7 on Fig. 6 and Fig. 8 is a view of a portion of the spraying apparatus showing another form of construction.

In accordance with my invention I am concerned generally with a machine which includes a tractor and a spraying apparatus, and I am not specifically concerned with the form, details or construction of either the tractor, as such, or the spraying apparatus, as such except as these elements involve features entering into my machine. In the drawings I have, for example, shown a typical tractor and a typical spraying apparatus and I have shown these typical units combined into a machine embodying my invention.

The tractor as shown in the drawings is of typical form and construction and involves, generally, a body A supported at its forward end by wheels B, and at its rear end by wheels C. The forward end portion of the body includes a power plant or engine 10 while the rear end portion includes power transmitting elements such as a differential 11, and a housed drive 12 extending rearwardly to the differential.

The particular tractor illustrated in the drawings is characterized by a coupling means at the rear end portion of the body A, which coupling means normally serves to provide a draft connection for ordinary farm implements. The means illustrated in the drawings includes a pair of arms 14 pivotally connected to the body of the tractor at 15, power means 16 for operating the arms 14, and a stabilizing link 17. The arms 14 are preferably alike and are spaced apart transversely of the tractor at the rear end portion thereof so that they project rearwardly from the tractor. The particular arms illustrated terminate at a point rearward of the rear wheels C of the tractor. Further, in the particular case illustrated the arms 14 are pivotally connected to mounting brackets 18 depending from the axle 13.

The operating means 16 for the arms 14 is provided to swing or operate the arms 14 in unison so that their outer ends can be moved to various points above the ground over which the tractor operates. The means 16 is a power means, that is, it is operated from power derived from the tractor and it includes power operated levers 19 coupled to the arms 14 by connecting rods 20. In the arrangement illustrated the levers 19 are located on the upper portion or side of the body of the tractor at the rear end portion thereof and the links 20 are swivelly connected to the levers and are pivotally connected to the arms 14 so that they extend downwardly and rearwardly from the levers to the arms as clearly illustrated in Figs. 6 and 7 of the drawings. It will be apparent that turning or swinging of the levers 19 by power available in the tractor causes movement or swinging of the arms 14 due to the coupling of the arms with the levers through the links 20. Further, it is to be understood that any suitable control means may be provided for the levers 19 in accordance with the construction common to devices of this character.

The stabilizing link 17 is preferably a single link located centrally of the tractor and preferably above the arms 14. In the particular case illustrated the link 17 has its inner or forward end coupled to a pivoted bracket 21 by a pivot pin 22, the bracket being pivoted to the tractor body A by a pivot pin 23. A suitable shock absorbing spring 24 is coupled to the bracket 21 as clearly illustrated in Figs. 6 and 7 of the drawings.

The spraying apparatus, as illustrated in the drawings, is characterized by a tank 25, a support 26 for the tank, a spray distributor 27, adjustable mounting means 28 for the spray distributor, pressure generating means 29 supplying operating pressure to the tank, supply means 30 between the tank and the spray distributor, and connecting means 31 between the tractor and the spraying apparatus.

The tank 25 may be any suitable vessel or receptacle that will properly handle the material to be sprayed. Where air under pressure is employed to propel the spray it is preferred that the tank be a closed vessel as I have shown in the drawings. The particular tank 25 illustrated throughout the drawings is a cylindrical tank closed at its ends and arranged horizontally so that it extends transversely of the machine. It is to be understood, of course, that the tank may be provided with a filling opening 33 and other accessories as may be necessary.

The support for the tank may involve front and rear legs 34 and 35, respectively, which depend from the tank and which may be provided with feet 36. In the case illustrated each leg is formed by a plate depending from the tank and extending parallel with the tank so that it is transverse of the machine. The legs are stabilized by a suitable brace 37.

The spray distributor 27 may, in practice, be varied widely in form and construction, depending upon the spray to be handled or the character of work to be performed. In the drawings I have shown typical forms of spray distributors which are such that they can be adjusted horizontally. The spray distributor illustrated in Figs. 1 to 7 of the drawings is shown extending horizontally at the rear of the machine and the particular distributor illustrated involves a plurality of horizontally disposed pipes 40 adjustably held by suitable holders 41 and provided with suitable spray nozzles 42. The holders, as shown in the drawings, are clamp devices which when released allow the pipes to be slid or adjusted horizontally to vary the positioning of the nozzles carried thereby. When the spray distributor is properly adjusted the holders are set, preventing relative movement of the pipes 40.

The adjustable mounting 28 for the spray distributor 27 is an important feature of the spraying apparatus since it is an element of the spraying apparatus that is coordinated with the adjustability afforded by the arms 14 that support the spraying apparatus from the tractor. The means 28 affords both angular and vertical adjustment of the spray distributor relative to the other parts of the spraying apparatus. In the form of the invention illustrated in Fig. 8 this adjustment is obtained by pivoted brackets carrying the spray distributor whereas in the other figures of the drawings I show a form of this means involving mounting brackets that are bodily shiftable vertically. This latter form of adjustable means is clearly illustrated in Figs. 4 and 5 wherein I show a bracket arm 50 supporting the holder 41 of means 27, a bracket arm 51 engaging the rear side of the rear leg 35 of means 26, and releasable fasteners 53 securing the arm 51 with the leg 35. The arms 50 and 51 may be integrally connected or joined, that is, they may be formed of a single body of material shaped as desired, and the desired vertical adjustment may be gained by providing vertically spaced openings 55 forming guideways in the leg 35 to accommodate the fastening means 53. The fastening means 53 may be simple bolts screw threaded into suitable nuts 54 operable in the guideways that can be easily operated, and by arranging the bolts in the guideway openings 55 it is possible to locate the distributor supporting arms 50 at any desired height. When angular adjustment is desired the arms 50 may be secured at different vertical heights thus establishing the spray distributor 27 in a position angularly related or inclined to the surface over which the apparatus is operating as shown in dotted lines in Fig. 2 of the drawings. In the form of the invention illustrated in Fig. 8 the arm 50ᵃ of the means 28ᵃ is pivotally connected to the leg 35 of means 26 by a pivoted pin 51ᵃ and a lock rod 53ᵃ is provided to hold the arm 50ᵃ in the desired adjusted position.

The pressure generating means 29 may be any suitable structure or machine that will serve to drive the spraying apparatus. In the case illustrated I show spraying apparatus to be driven by compressed air, in which case the means 29 involves a prime mover or engine 60 driving a suitable air compressor 61 provided with suitable control and regulating means and connected to the tank 25 to deliver air thereto in the desired manner.

The supply means 30 between the tank and spray distributor may be any suitable connection that will properly handle spray so that it is delivered from the tank to the spray distributor. In the case illustrated a main feed line 70 from the tank is connected to a header or manifold 71 by a flexible connection 72 and individual connections 73 connect the header with the pipes 40 of means 27. It is to be understood, of course, that the structure just described may be provided with suitable control and regulating means, as may be required.

The connecting means 31 that I provide between the tractor and the spray apparatus is a simple means serving to connect the arms 14 and link 17 of the tractor with the spraying apparatus, preferably with the tank 25 thereof. In the preferred form of the invention the means 31 involves a pair of depending brackets 80 on the tank 25 carrying pivot pins 81 by which the outer ends of the arms 14 are pivotally connected to the brackets and a bracket 82 projects from the side of the tank at the middle of the machine and toward the tractor to carry a pivot pin 83 that pivotally connects the outer end of link 17 with the tank.

Through the simple, dependable parts just described the tank 25 of the spraying apparatus is coupled to the tractor so that as the arms 14 of the tractor are moved through the power means 16, the spraying apparatus is bodily adjusted vertically and it may be moved from a position where the feet of the means 26 rest on the ground over which the tractor operates to a fully up position where the spraying apparatus is spaced a substantial distance above the ground. The means 31 together with the arms 14 and link 17 of the tractor couple the tractor and the spraying apparatus so that the spraying apparatus is not only carried or conveyed by the tractor but is readily adjustable vertically relative thereto through the power of the tractor. This adjustment of the spraying apparatus bodily relative to the tractor through the power of the tractor coupled with the adjustability of the spray distributor incorporated in the spraying apparatus itself affords complete adjustment of the spraying apparatus to the end that all ordinary working conditions are effectively met.

I may provide a stop means to limit downward movement of the spray apparatus so that as the machine is operated the operator will not accidentally allow the spray apparatus to drop either to the ground or to vegetation over which the apparatus is being operated. In the drawings I show a stop means 90 which involves a simple, transversely disposed stop bar 91 secured to the forward leg 34 by a releasable fastener 92 so that it occurs above the arms 14. The fastening means 92 may be simple bolts engaged in selected holes provided in the leg 34. By providing holes at various points vertically in the leg 34 the stop bar 91 can be located in any desired position. When the stop bar is in place, as shown in Fig. 6, it overlies and will engage the arms 14 upon the spraying apparatus being lowered a predetermined amount relative to the tractor.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, a tractor having an arm pivoted thereto and projecting therefrom and having power means operating the arm in a vertical plane, unitary spraying apparatus including a tank, a spray distributor, and means mounting the spray distributor on the tank to shift vertically relative thereto, and means coupling tank of the spraying apparatus and said arm for vertical adjustment of the entire spraying apparatus by the arm.

2. In apparatus of the character described, a tractor, an arm pivotally carried by the tractor and projecting therefrom, power means carried by the tractor and operating the arm vertically, a unitary spraying apparatus including a tank, a spray distributor, means by which the distributor is adjustable horizontally, and means mounting the spray distributor on the tank for vertical adjustment relative thereto, and a coupling between the spraying apparatus and said arm through which operation of the arm adjusts the spraying apparatus vertically.

3. In apparatus of the character described, a tractor, and arm pivoted to the tractor and projecting rearwardly therefrom, power means operating the arm vertically, spraying apparatus including a tank, a ground engaging support for the tank depending from the lower portion thereof, and a spray distributor carried by the support, and means coupling the spraying apparatus and said arm for support of the spraying apparatus by the arm and for vertical adjustment of the spraying apparatus by the arm to move the ground engaging support into and out of ground engaging position.

4. In combination, a tractor having a pivoted arm projecting rearwardly therefrom and having power means operating the arm vertically, unitary spraying apparatus including a tank, a support for the tank depending from the lower portion thereof, and a spray distributor carried by the support, and means coupling the bottom of the tank and said arm for support and vertical adjustment of the apparatus by the arm including, a bracket depending from the bottom of the tank and pivotally connected to the arm.

5. Apparatus of the character described applicable to a tractor having a pivoted arm projecting therefrom and power means operating the arm vertically including, a spray carrying tank, a spray distributor, means pivotally mounting the distributor on the tank to move vertically relative thereto, and means mounting the spray carrying tank on said arm for vertical adjustment thereof.

6. In combination, a tractor having a pivotally mounted arm projecting therefrom, power means operating the arm vertically, and a stabilizing link pivoted thereto and projecting therefrom, spraying apparatus including a tank, the spray distributor carried by the tank, and means coupling the arm and the tank for support and vertical adjustment of the apparatus by the arm, and means pivotally connecting the tank and stabilizing link.

7. In combination, a tractor having a pivoted arm projecting therefrom and having power means operating the arm vertically, unitary spraying apparatus including a tank, pressure generating means carried on the tank, and a spray distributor mounted on the tank for adjustment relative thereto, and a releasable coupling between the spraying apparatus and said arm.

8. In apparatus of the character described, a tractor having a pivoted arm projecting therefrom and having power means operating the arm vertically, a unitary spraying apparatus including a tank, ground engaging supporting legs depending from the tank, and a spray distributor carried by one of the legs, and means releasably coupling the spraying apparatus and said arm for vertical shifting of the spraying apparatus by the arm to move the legs into and out of engagement with the ground.

9. In apparatus of the character described, a tractor, a pair of rearwardly projecting pivoted arms carried by the tractor, power means operating the arms vertically, a pivoted stabilizing link carried by the tractor and cooperatively related to the arms, a spray carrying tank, spaced brackets on the tank to which the arms and link are releasably pivotally connected, depending ground engaging legs on the tank, a pressure generator mounted on the tank, a spray distributor, supply means connecting the tank and distributor, and mounting means for the distributor mounting it on the rearmost leg for vertical adjustment.

10. Apparatus applicable to a tractor having a pair of rearwardly projecting pivoted arms and power means operating the arms vertically including, a stabilizing link pivoted on the tractor and cooperatively related to the arms of the tractor, and a unitary spraying apparatus including, a tank, brackets on the tank, means releasably pivotally connecting the arms and link to the brackets, depending legs on the tank, a pressure generator mounted on the tank, a spray distributor, supply means connecting the tank and distributor, and mounting means for the distributor slidably mounting it on the rearmost leg for vertical adjustment relative thereto.

11. In combination, a tractor including a pair of rearwardly projecting pivoted arms, power means simultaneously operating the arms vertically, and a stabilizing link pivoted at a point above the arms, and a spraying apparatus including, an elongate horizontal tank disposed transversely of the tractor at the rear thereof, spaced brackets on the tank to which the arms and link are releasably pivotally connected, spaced depending ground engaging legs on the tank extending longitudinally thereof, a pressure generator on the tank, a spray distributor, supply means connecting the tank and distributor, and mounting means for the distributor pivotally mounting it on the rearmost leg for vertical adjustment relative thereto.

BRYANT ESSICK.

REFERENCES CITED

The following references are of record in the file of this patent:

UNITED STATES PATENTS

| Number | Name | Date |
| --- | --- | --- |
| 2,171,205 | Zinke | Aug. 29, 1939 |
| 2,370,914 | Rasmussen et al. | Mar. 6, 1945 |
| 2,381,649 | Dalton | Aug. 7, 1945 |
| 2,391,027 | McLemore et al. | Dec. 18, 1945 |
| 2,464,224 | Grabert | Mar. 15, 1949 |
| 2,447,071 | Huffman | Aug. 17, 1948 |

OTHER REFERENCES

Ford Tractor Equipment News for Winter 1942.